P. C. HEWITT.
SYSTEM OF ELECTRICAL DISTRIBUTION.
APPLICATION FILED APR. 28, 1905. RENEWED JAN. 27, 1913.
1,064,691.
Patented June 10, 1913.
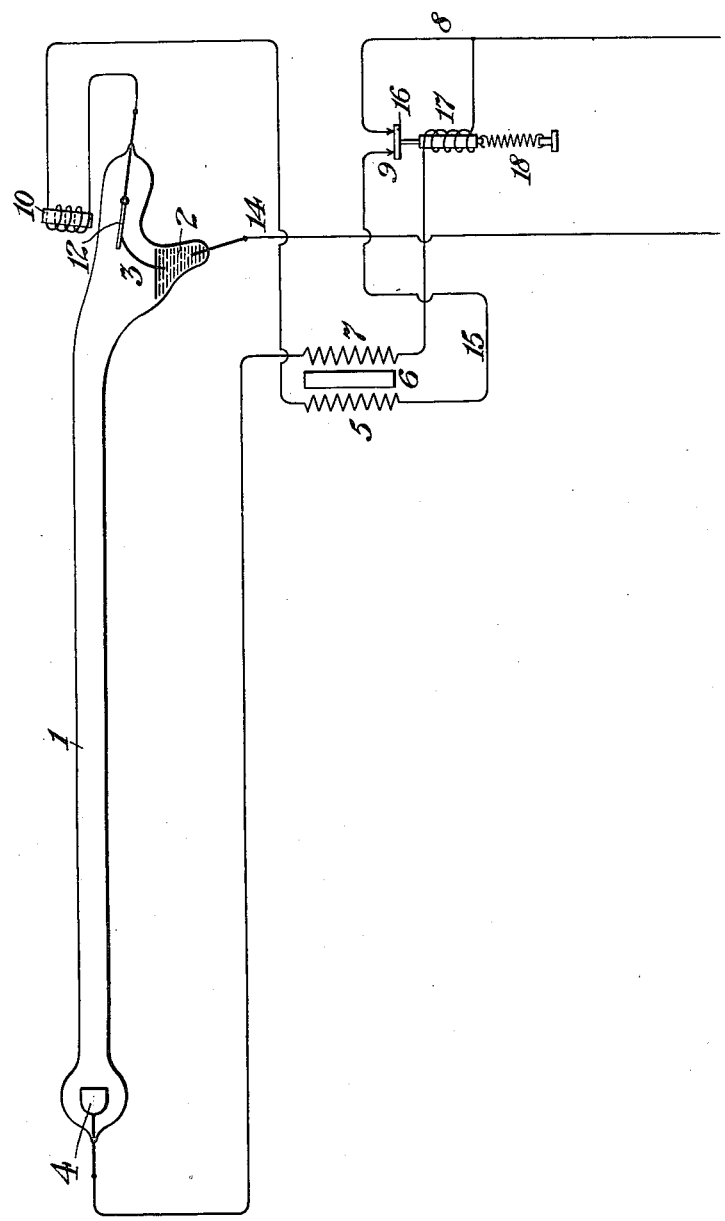

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

SYSTEM OF ELECTRICAL DISTRIBUTION.

1,064,691.        Specification of Letters Patent.     Patented June 10, 1913.

Application filed April 28, 1905, Serial No. 257,809. Renewed January 27, 1913. Serial No. 744,594.

*To all whom it may concern:*

Be it known that I, PETER COOPER HEWITT, a citizen of the United States, and resident of New York, county of New York, State of New York, have invented certain new and useful Improvements in Systems of Electrical Distribution, of which the following is a specification.

My invention relates to the class of apparatus known as vapor electric devices in which an electric current is caused to traverse an inclosed gas or vapor path.

The object of the invention is to provide convenient means for starting the device into operation as well as to continue the operation.

The general plan of the invention involves the starting of the device by the separation of two contacting electrodes and the substitution of a third electrode in place of one of the first named electrodes, utilizing the current in the circuit to energize a core having a secondary winding in circuit with the working positive electrode, thereby momentarily boosting the main current at the positive electrode by fluctuation, or variation or cessation of the current flow at the negative electrode and the temporary positive electrode. The primary coil may be of finer wire and more turns than the secondary or working coil. This secondary and core may act as a steadying resistance for the lamp while in operation.

In the accompanying drawing, I have illustrated one form of the apparatus, showing the circuit connections in diagram.

Referring to the drawing, 1 represents an inclosing chamber of any suitable character containing an electrode 2 which may conveniently be of mercury and an adjacent electrode 3 adapted to make contact with the electrode 2. At a more remote portion of the chamber there is located a third electrode, 4 which may be of soft iron, mercury or other suitable material. The electrode 2 is shown as being connected with a conductor 14 which may be the negative side of a continuous source of electric current when the apparatus is to be operated by means of direct current. The electrode 3 is connected through a coil 5 and conductor 15 with a cut-out 9 and with the positive main line conductor 8. This coil is provided with a core 6, wound with a second coil 7. This core and its coils constitute a transformer. The electrode, 4, is connected through the coil 7 with the main conductor 8. The coils of an electromagnet, 10, are connected in the circuit leading to the electrode, 3. The electrode, 3, carries an armature, 12, which is acted upon by current traversing the coils of the electromagnet, 10, so that when the latter is traversed by current, it will raise the electrode 3, out of contact with the electrode, 2. When therefore current is turned upon the device, it will first flow through the conductor, 8, to the electrode, 3, thence through the electrode, 2, and back to conductor, 14. Thereupon the electrode, 3, will be separated from electrode, 2, and current will immediately flow across the intervening space. In practice, I have found that the variations in the flow of current which automatically take place due to various causes, will quickly cause a passage of current between the electrode, 4, and the electrode, 2. This action is in a measure brought about by the presence of coil, 7, acting as a secondary to the coil 5, the slight variations in the passage of current through the coil, 5, serving to cause a momentary higher potential to be applied between electrodes, 4, and 2, than that which is normally impressed by the main circuit.

In the drawing, I have shown a coil 17, included in the circuit between the conductor, 8, and electrode, 4, for operating the cut-out, 9, so that when current flows to the electrode, 4, the core of the coil, 17, carrying an arm, 16, is drawn downward. This causes an interruption in the circuit connections leading to the electrode, 3, thus overcoming any tendency which might remain for current to traverse the device from the electrode, 3, after current flow through the electrode, 4, has been started.

A spring, 18, or other convenient means, may be employed for holding the bridge piece, 16, against its corresponding contacts. The fact that the electrode, 3, falls back into contact with electrode, 2, upon the interruption of its circuit, does not interfere with the operation of the device, and in case for any reason there should be a cessation of current flow from electrode, 4, the device will be re-started in the manner already described.

The coils, 5 and 7, may be adjusted with reference to each other. In practice, I have found that it is not necessary to wind the coil, 7, for very high electromotive force.

In an application Serial Number 703,128, filed June 12th, 1912, which is a division of the case of which the present is a renewal, I make claims on certain aspects of the present invention.

I claim as my invention:

1. In a vapor electric apparatus of the character described, the combination of two working electrodes, a starting electrode, means for separating the starting electrode from one of the working electrodes, a transformer having one coil connected in circuit with the starting electrode and the other coil connected in circuit with the other working electrode.

2. In a vapor electric apparatus of the character described, the combination of two working electrodes, a starting electrode, means for separating the starting electrode from one of the working electrodes, a transformer having one coil connected in circuit with the starting electrode and the other coil connected in circuit with the other working electrode, and means for interrupting the circuit of the starting electrode by current passing in the circuit of the last named working electrode.

3. In a vapor electric apparatus of the character described, the combination of two working electrodes, a starting electrode, means for separating the starting electrode from one of the working electrodes, a transformer having one coil connected in circuit with the starting electrode and the other coil connected in circuit with the other working electrode, and means in the circuit of the last named working electrode for interrupting the circuit connected with the starting electrode.

4. In a vapor electric apparatus of the character described, the combination of two working electrodes, a starting electrode and a transformer having its respective coils electrically connected in the circuits leading to one working electrode, and to the starting electrode.

5. In a vapor electric apparatus of the character described, the combination of two working electrodes, a starting electrode, a transformer having its respective coils electrically connected in the circuit leading to a working electrode and to the starting electrode and means for moving the starting electrode to make and break contact with the other working electrode.

6. In a vapor electric apparatus of the character described, the combination of two working electrodes, a starting electrode, a transformer having its respective coils electrically connected in the circuit leading to a working electrode and to the starting electrode, means for moving the starting electrode to make and break contact with the other working electrode, and means operated by current passing in the circuit leading to the first named working electrode for cutting out the starting electrode.

7. In a vapor electric apparatus of the character described, the combination of two working electrodes, a movable electrode, a transformer having its respective coils electrically connected in the circuits leading to the electrodes, means for causing the movable electrode to break contact with one of the working electrodes and means for cutting the movable electrode out of circuit.

8. In a vapor electric apparatus of the character described, the combination of two working electrodes, a movable electrode and a transformer having its respective coils electrically connected in the circuits leading to the working electrode and the movable electrode, and means operated by current flow to one of the working electrodes for causing the movable electrode to break contact with said working electrode.

9. The hereinbefore described method of starting and operating electric vapor apparatus which consists in initiating current flow between neighboring electrodes, causing variations in such flow to impress a higher electro-motive force upon the working electrodes and thereby causing current flow between working electrodes.

10. The hereinbefore described method of starting and operating vapor electric apparatus which consists in initiating current flow between neighboring electrodes, causing variations in such flow to impress a higher electro-motive force upon the working electrodes and thereby causing current flow between the working electrodes and thereupon automatically causing an interruption of the initial current flow.

11. A mercury vapor lamp comprising an exhausted container, a solid anode at one end thereof and a mercury cathode at the other, said container including an approximately horizontal tubular light giving portion, a supplementary hinged or flexibly mounted anode adapted to contact by gravitation with said cathode and located in an extension of the tubular portion of the light giving path, together with an electro-magnet actuated by current through said cathode to move said hinged anode out of contact with said cathode.

12. The method of initiating current flow in a vaporous conducting device including electrodes, which consists in initially generating ionized vapor therein and separately impressing upon said electrodes an electromotive force higher than the normal working voltage but not high enough of itself to start and maintain an arc between said electrodes.

Signed at New York, in the county of New York, and State of New York, this 26th day of April A. D. 1905.

PETER COOPER HEWITT.

Witnesses:
 WM. H. CAPEL,
 GEORGE H. STOCKBRIDGE.